United States Patent [19]
Gulick, Jr.

[11] Patent Number: 6,046,848
[45] Date of Patent: *Apr. 4, 2000

[54] INTEGRAL IMAGE DISPLAY

[75] Inventor: Stephen Gulick, Jr., Rochester, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/771,189

[22] Filed: Dec. 20, 1996

[51] Int. Cl.⁷ .................................................. G02B 27/22
[52] U.S. Cl. ............................................ 359/463; 355/22
[58] Field of Search ................................ 359/462, 463; 430/322, 324, 325, 394, 396; 355/22

[56] References Cited

U.S. PATENT DOCUMENTS

| | | | |
|---|---|---|---|
| 3,268,238 | 8/1966 | Finkel | 283/63 |
| 3,538,632 | 11/1970 | Anderson | 40/106.51 |
| 4,734,779 | 3/1988 | Levis et al. | 358/231 |
| 4,870,768 | 10/1989 | Watt et al. | 40/430 |
| 4,920,039 | 4/1990 | Fotland | 430/324 |
| 4,935,335 | 6/1990 | Fotland et al. | 430/324 |
| 5,049,987 | 9/1991 | Hoppenstein | 358/88 |
| 5,065,621 | 11/1991 | Holder | 73/188 |
| 5,146,703 | 9/1992 | Boden | 40/454 |
| 5,279,912 | 1/1994 | Telfer et al. | 430/17 |
| 5,461,495 | 10/1995 | Steenbilk et al. | 359/463 |
| 5,479,270 | 12/1995 | Taylor | 358/488 |
| 5,488,451 | 1/1996 | Goggins | 355/77 |
| 5,543,964 | 8/1996 | Taylor et al. | 359/463 |

OTHER PUBLICATIONS

"Torsion Bridge" page.

*Primary Examiner*—Safet Metjahic
*Assistant Examiner*—Michael Dalakis
*Attorney, Agent, or Firm*—Gordon M. Stewart; William F. Noval

[57] ABSTRACT

An integral image display carrying, on the same side of a single substrate, a plurality of separate different integral images on different regions of the substrate, each of which images has a plurality of views, at least one of the views of one integral image following sequentially from a view in another one of the integral images. Particularly, one of the complete images may follow sequentially from the other one. The sequences of each integral image may particular be motion sequences.

6 Claims, 7 Drawing Sheets

INTEGRAL IMAGE DISPLAY

FIELD OF THE INVENTION

The invention relates generally to the field of integral image elements which may particularly display motion.

BACKGROUND OF THE INVENTION

Integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following Unites States patents: U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others; as well as allowed U.S. Pat. No. 5,543,964. Lenticular image elements are therefore considered a special case of the broader integral image element class.

Integral image elements using reflective layers behind the integral image to enhance viewing of the integral image by reflected light, are also described in U.S. Pat. No. 3,751,258, U.S. Pat. No. 2,500,511, U.S. Pat. No. 2,039,648, U.S. Pat. No. 1,918,705 and GB 492,186. While various types of reflecting layers are described in the foregoing, none of those references attaches any particular importance to the characteristics of the reflective layer nor suggests how such characteristics might affect image quality seen by a viewer.

Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. Similar integral image elements, such as described in U.S. Pat. No. 3,268,238 and U.S. Pat. No. 3,538,632, can be used to convey a number of individual two-dimensional scenes (such as unrelated scenes or a sequence of scenes depicting motion) rather than one or more three-dimensional images. However, the appearance of animated images with an apparent look-around ability, has been suggested in U.S. Pat. No. 5,543,964. In practice, when smaller sized versions of such images are manufactured, they are often produced with many copies of the same integral image on one sheet, the individual images being later cut apart for use.

An inherent limitation with animated lenticular images, such as those of No. 3,268,238, U.S. Pat. No. 3,538,632, or suggested by U.S. Pat. No. 5,543,964, is that the range of animation that can be captured, or its detail, is necessarily limited. In particular, where it is desired to record an animation sequence with "n" views, this means that lines from those "n" views must be interleaved such that there are at least "n" image lines (sometimes referenced as image strips) under each lenticule. The lines must have some finite width which is limited to the resolution of the printer used to print them, and the lenticular lenses have limited resolving power. Therefore, "n" is an integer which is necessarily limited for any given size lenticular image element. With current technology, "n" can allow up to about 25 views under a lenticule for an image intended to be viewed a few inches or a few feet away. However, even if technology might improve this number, it will always be desirable to have a way of capturing on a lenticular image, even more views. In this way, even longer motion sequences could be captured and displayed, or even more detail of a particular range of motion could be displayed.

SUMMARY OF THE INVENTION

The present invention then, provides a motion image element carrying, on a single substrate, a plurality of separate different integral motion images on different regions of the substrate. Each of the integral motion images has a plurality of views. In these views at least one scene element is in motion. The motion sequence of a second one of the integral motion images follows sequentially from the motion sequence of a first one of the integral motion images.

In another aspect of the present invention, there is provided a motion image element on a single substrate, having a plurality of separate different integral images on different regions of the substrate. Each of the integral motion images has a plurality of views in which at least one scene element is in motion. The motion sequence of each one of the integral images after a first one, are arranged to follow sequentially from the motion sequence of an adjacent preceding one of the integral motion images.

In still a further aspect of the present invention, an integral image is provided, which integral image has a plurality of separate different integral images on different regions of the substrate. Each of those images has a plurality of views, at least one of the views of one integral image following sequentially with at least one of the views of another integral image.

The integral image of the present invention allows for the capture and display on a single substrate, of a wider range of motion or greater motion detail, than is otherwise available.

BRIEF DESCRIPTION OF THE DRAWINGS

To facilitate understanding, identical reference numerals have been used, where possible, to designate identical elements that are common to the figures.

EMBODIMENTS OF THE INVENTION

It will be appreciated in the present invention, that while the integral lens sheet could be a fly's eye lens sheet it is more preferably a lenticular lens sheet. Further, by an "integral" image is referenced an image composed of segments (lines, in the case of a lenticular lens sheet) from a plurality of views, which segments are aligned with respective individual lenses so that each of the one or more views can be observed when a user's eyes are at the correct angle relative to the imaging element. Reference to integral images being "different", refers to each integral image not containing only the same plurality of views (and often none of the views will be the same).

Figure 1:
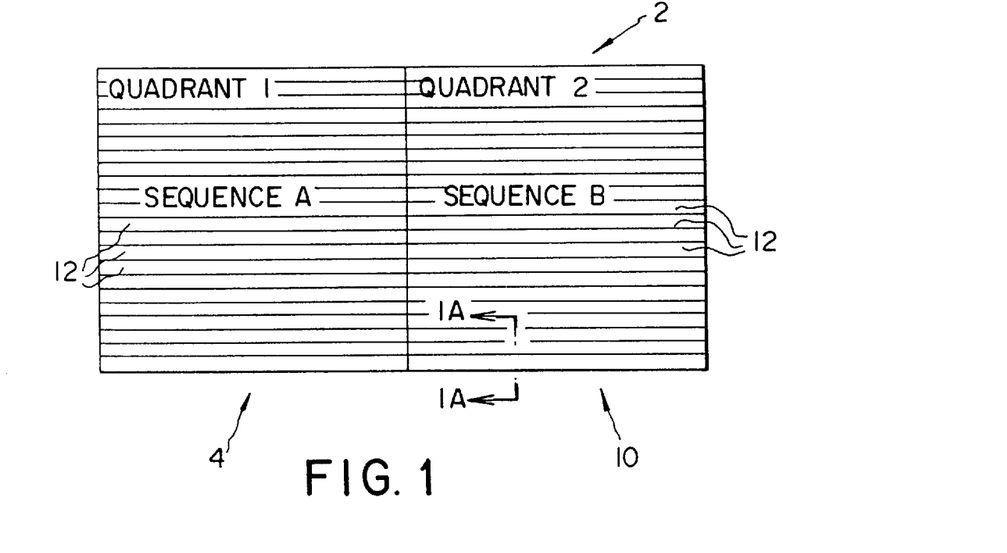
FIG. 1 illustrates a lenticular image display of the present invention and the sequence of views captured on each of two lenticular images of the display.
Figure 1A:
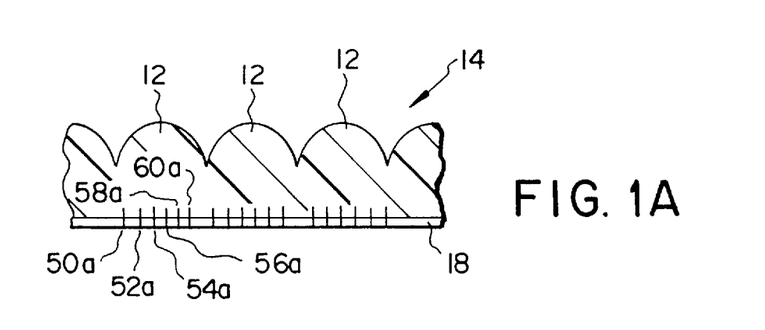
FIG. 1A is a cross-section through a portion of the display of FIG. 1, taken along the line 1A—1A in FIG. 1.

Turning now to FIG. 1, there is shown a particular lenticular motion image display 2. Motion image display 2 is composed of a flat substrate 18 which may be transparent, translucent, or reflective. For example, substrate 18 may be made of paper, plastic or any other suitable material. Display 2 has on the single substrate 18, two separate but immediately adjacent lenticular motion images 4 and 10. Each lenticular motion image 4 and 10 has a plurality of views. In the case of lenticular motion image 4, these are the six views 20 through 30, while in the case of lenticular motion image 10 these are the six views 50 through 60. Only some of the views in motion images 4 and 10 are shown explicitly in FIG. 1 for simplicity, although the content of other of the views such as views 22, 24 or 54, 56 would be some in between motion views between first and last views 20, 30 for Sequence A, and 50, 60 for Sequence B. More particularly, referring for example to the views 50 through 60, these are carried on substrate 18 in the form of interleaved (interlaced) lines taken from each of the views and printed on substrate 18 in a known manner. The formation of suitable integral images by interleaving lines from different views, and their exposing or writing to the back side of integral imaging elements, is described for example, in U.S. Pat. No. 5,278,608, U.S. Pat. No. 5,276,478 and U.S. Pat. No. 5,455,689. Thus, line 50a through 60a represent lines from views 50 through 60, respectively. Each set of six interleaved image lines is overlayed by an aligned lenticular lens 12 (sometimes simply referenced as a "lenticule") of a lenticular lens sheet 14, in a manner known for constructing lenticular images displaying motion. Lens sheet 14 may for convenience of manufacture, be single one-piece lenticular lens sheet extending across both of the lenticular motion images 4, 10.

Note that on the display of FIG. 1 lenticules 12 extend horizontally as shown in FIG. 1. At this point it should be noted that terms such as "horizontal" and "vertical" are used in a relative, not absolute, sense. However, the lenticules 12 in FIG. 1 are oriented horizontally as shown since this is the manner the lenticular motion images 4, 10 thereon will normally be viewed. The different views making up each motion image can then be viewed by tilting the complete display 2 back and forth vertically about a horizontal axis, that is in a direction indicated by arrow 19 in FIG. 1B, to be viewed by a viewers eyes 3 (only one of which can be seen in FIG. 1B, the other being behind or in front of the one visible in FIG. 1B).

Figure 1B:
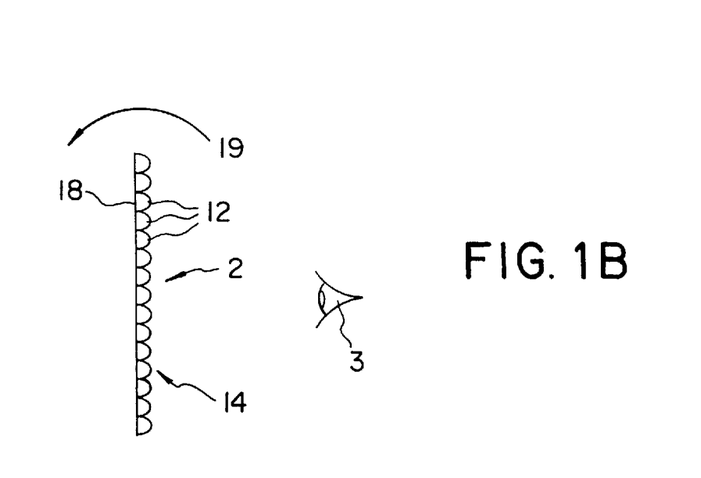
FIG. 1B is an end view of the display of FIG. 1 illustrating its normal direction of tilting for viewing.
Figure 1C:
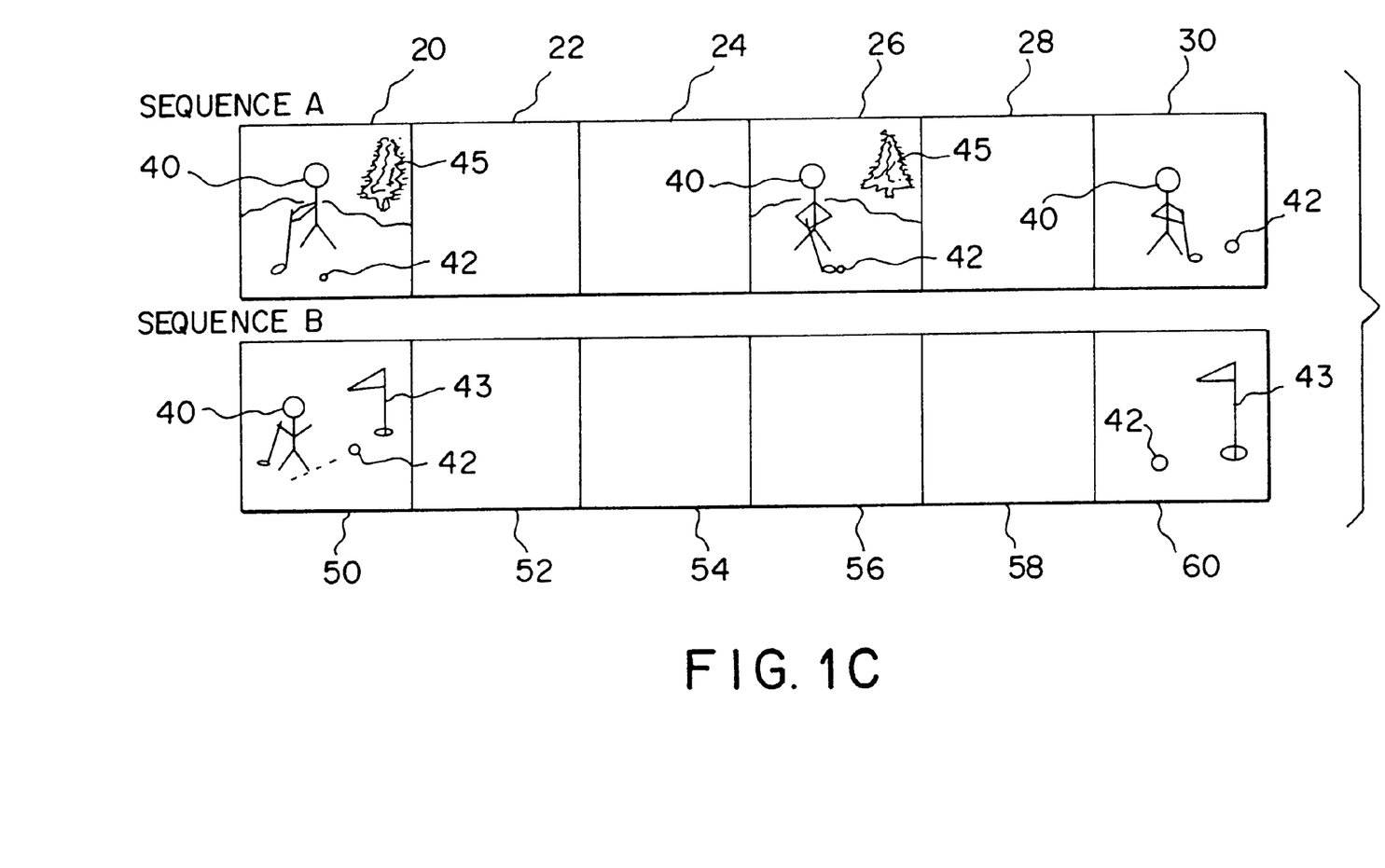
FIG. 1C is a diagrammatic view of image sequencer A and B.

As shown in FIG. 1C, the sequence of views which will be observed by a user when tilting display 2 as described above, are illustrated by Sequence A for integral motion image 4 and Sequence B for integral motion image 10. Both Sequences A and B have at least one scene element in motion. In particular, Sequence A illustrates a person 40 in the motion of hitting a golf ball 42. Scene elements in motion are elements which appear to be moving relative to other scene elements or the image frame. Thus, multiple views of a scene obtained by panning across it (such as panoramic views) represent motion since all scene elements are in motion relative to the frame through the series of views. In each of Sequences A and B scene elements in motion include the common elements of person 40 and golf ball 42, while other elements such as tree 45 in Sequence A (which is not common to Sequence B) and flag 43 in Sequence B, remain stationary. Further, person 40, golf club 41 golf ball 42 are scene elements in common in both lenticular motion images 4, 10 (golf club 41 being shown in motion in lenticular motion image 10.

It will be appreciated that the motion sequence of Sequence B follows sequentially from the motion sequence seen in Sequence A. That is, in Sequence A the person 40 is in the motion of hitting ball 42, while in Sequence B ball 42 is seen rolling toward flag 43. Thus, the complete motion in Sequence B when viewed in light of Sequence A, can logically follow from the complete motion which can be viewed in Sequence A. However, sequential following of one view from another does not require motion since one view can logically follow another without motion. For example, a series of views showing the same person in the same position but aging or morphing over time represents a series of views in which subsequent views sequentially follow preceding views, yet there is no motion.

By tilting display 2 from a starting position in the direction of arrow 19 in FIG. 1B then, a user can first direct her eyes to lenticular motion image 4 and observe the sequence of views 20 through 30. The user can then return display 2 back to the starting position, and again tilt the display 2 backward from the starting position to the observe the views 50 through 60. Thus, a user is able to observe a sequence that can be twice as long or twice as detailed, than might otherwise be possible with prior motion lenticular images, simply by tilting the same substrate back and forth and moving her eyes only slightly.

Figure 2:
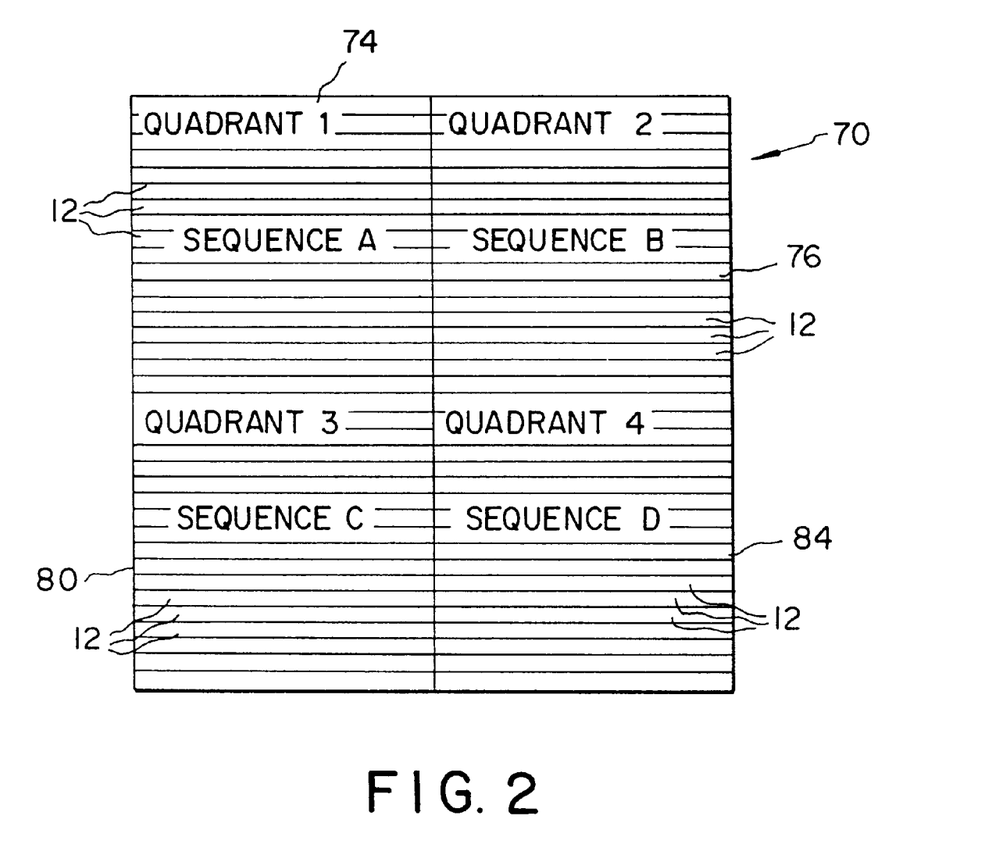
FIGS. 2 and 2A are views similar to FIGS. 1, 1A and 1B but of another embodiment of a display of the present invention, and the views captured on each of the lenticular images of the display.
Figure 2A:
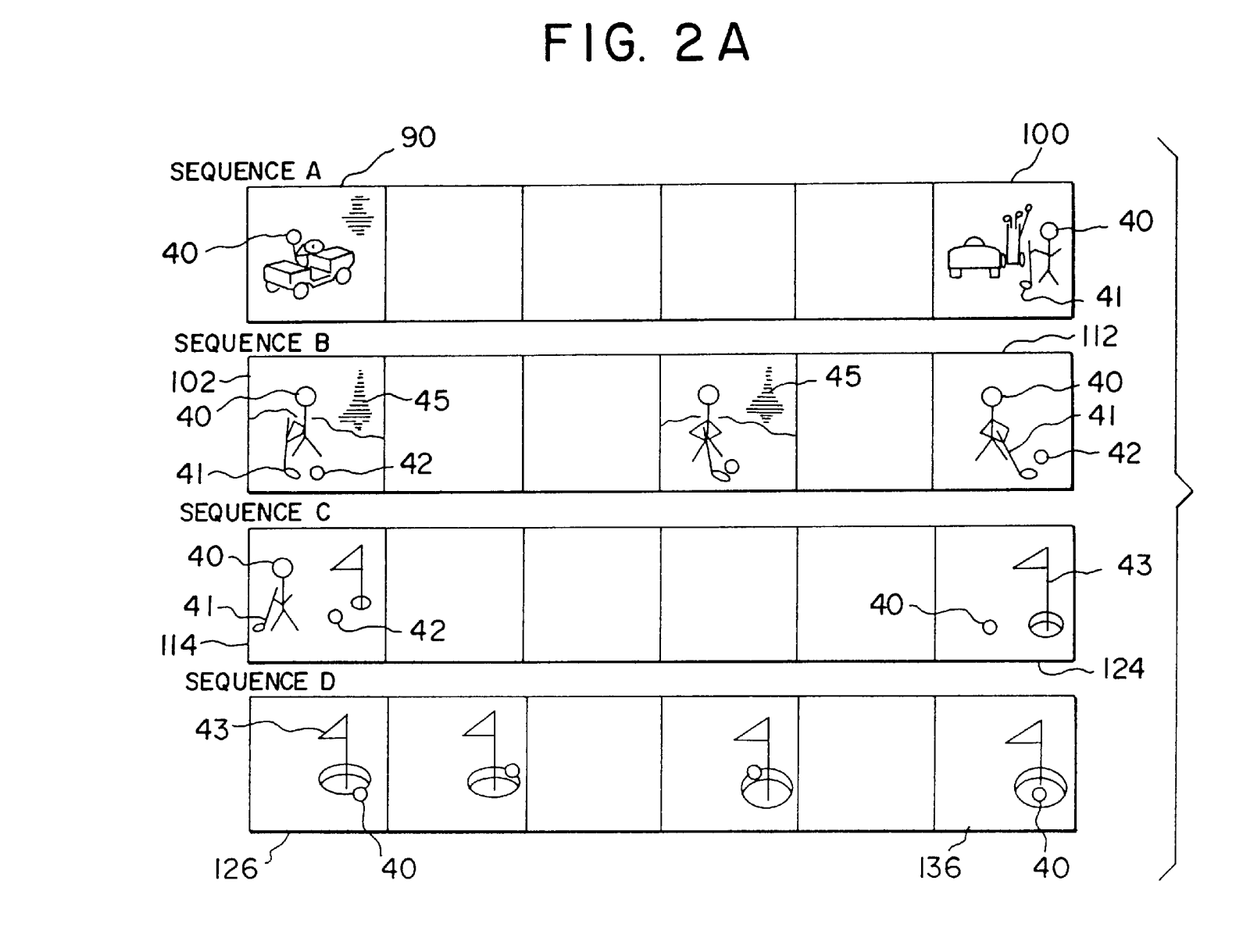

Motion image displays of the present invention need not be limited to just two integral motion images. For example, any number could be provided on a flat substrate. FIGS. 2 and 2A illustrates a display 70 with four lenticular motion images 74, 76, 80, 84. The views which can be seen by a user in motion images 74, 76, 80, 84 are illustrated as Sequences A, B, C and D, respectively. Sequence A consists of six views 90 through 100, while those of sequences B, C, and D each consists of six views 102 to 112, 114 to 124, and 126 to 136, respectively. Note again that each Sequence has at least one scene element in motion. For example, person 40 in Sequence A, and ball 42 in Sequence B, C and D. Further the motion image 76, 80 or 84 which follows sequentially from the preceding motion image 74, 76, 80 respectively, has at least one scene element in common with that sequentially preceding image. For example, person 40 is a common scene element in Sequences A, B and C and is in motion in each, while ball 42 is a common scene element in Sequences B, C and D and is in motion in each. Such common scene elements, particularly when in motion, assist a user to understand which motion image sequentially follows from which other motion image (that is, to determine the order of the lenticular motion images). However, by the order will often be determinable even without the presence of such common scene elements, depending upon the content of the lenticular motion images.

With the display 70 of FIGS. 2 and 2A then, tilting display vertically in the same manner as described in connection with FIG. 1B, through 3 and ½ cycles, will allow a user to see all of the motion sequences of motion images 74, 76, 80 and 84. Note that the order of the sequences is A through D. Again, a user need only shift the their eyes slightly during such movement. Thus, display 70 allows a user to view motion for a duration or detail four times that possible with prior motion lenticular images.

Figure 3:
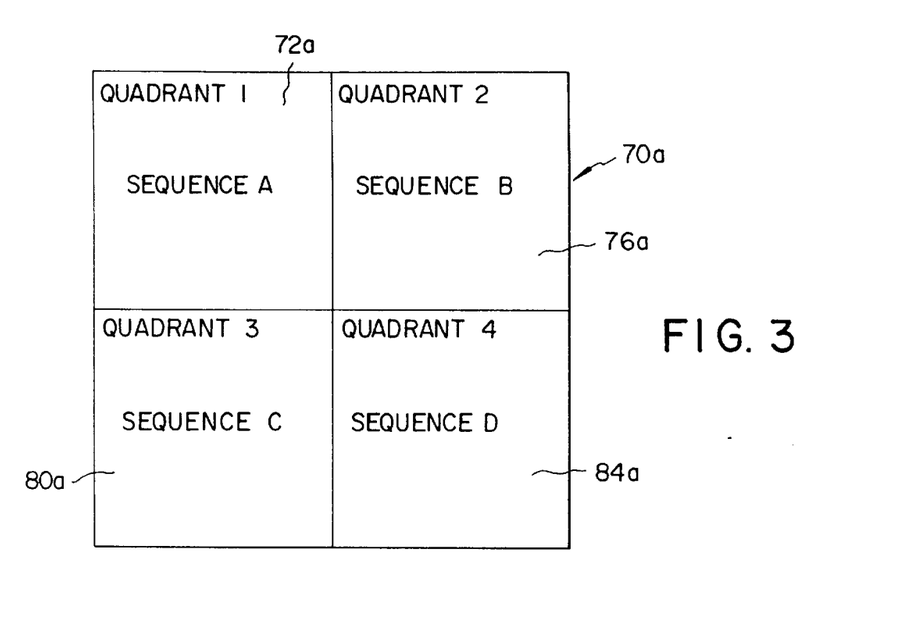
FIGS. 3 and 3A are views similar to FIGS. 2 and 2A but illustrating another embodiment in which each integral image other than a last one, has a final view with a visual indicator to direct a viewer to the following adjacent integral image.
Figure 3A:
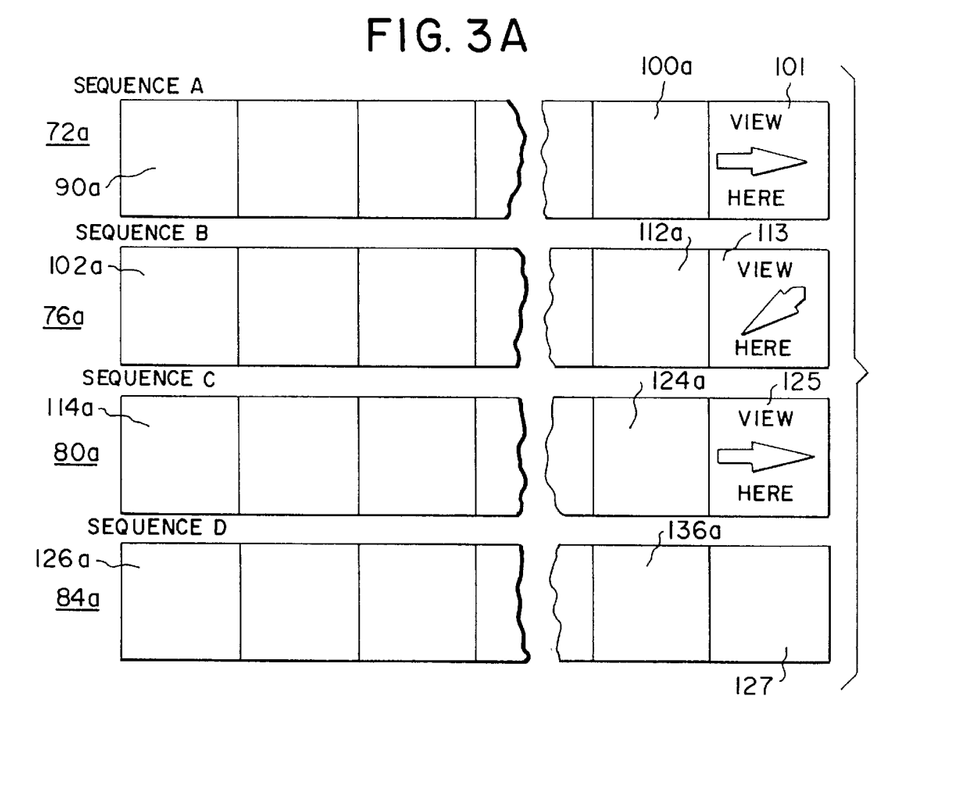

Referring now to FIGS. 3 and 3A, the motion image display 70*a* is similar in construction to display 70 of FIG. 2, and similar parts have been numbered the same except with the addition of an "a". However, an additional last view 101, 113, 125, 137 of each motion image 72*a,* 76*a,* 80*a,* 84*a* respectively, is provided with a visual indicator in the form of the arrow shown and the words "VIEW HERE" which directs a viewer during tilting of the display 70*a,* to the following adjacent integral motion image. That is, the arrow and "VIEW HERE" of the last image 101 in motion image 72*a,* then directs a viewer to motion image 76*a.* The arrow in the last image 113 then directs the viewer to motion image 80*a,* and similarly the last image 125 directs a viewer to motion image 84*a.* Note that the visual indication described, operates in addition to any motion or scene content which might help direct a viewer to the next adjacent integral motion image (that is, the adjacent motion image which follows sequentially from the viewed motion image). By one motion image being "adjacent" another in the foregoing context, is referenced the situation where there are no other motion images between the two motion images. Thus, motion images 70*a* and 80*a* are adjacent one another, as well as, for example, are motion images 80*a* and 84*a.*

Figure 4:
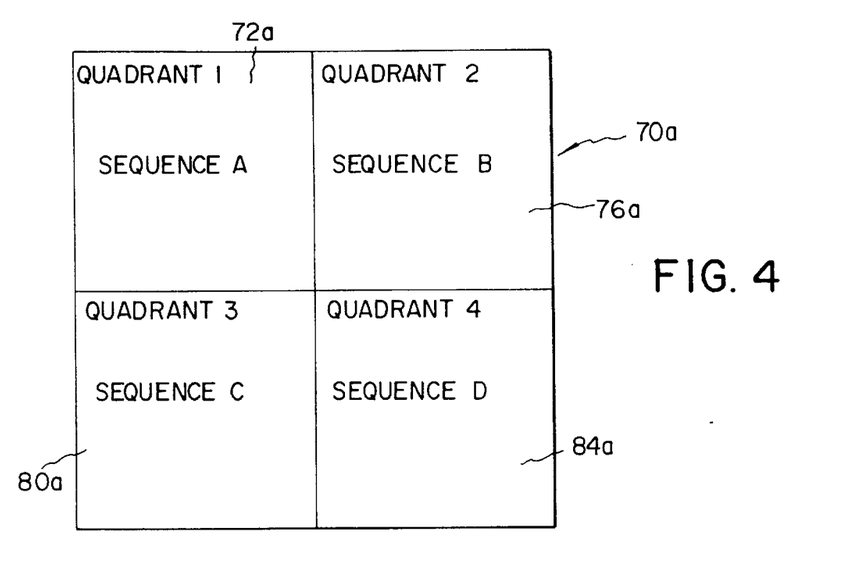
FIGS. 4 and 4A are views similar to FIGS. 3 and 3A but with a different visual indicator.
Figure 4A:
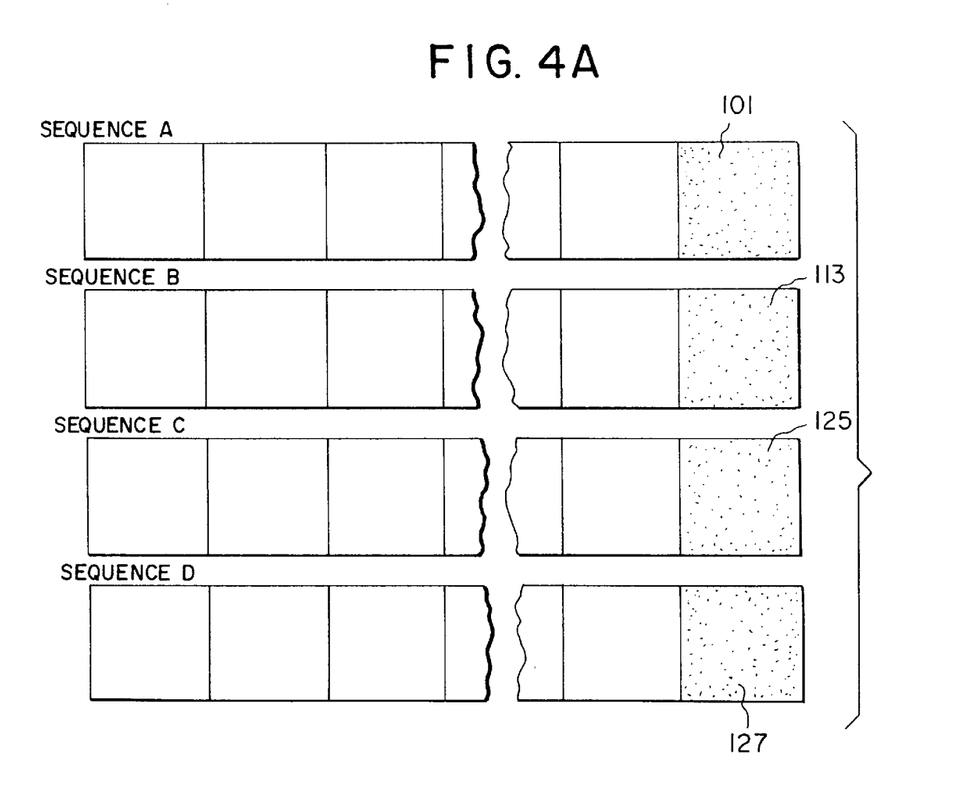

It will be appreciated that visual indicators other than the arrows and the words "VIEW HERE" can be used to provide the desired visual indication which directs a user to the following adjacent integral motion image. For example, the last frames 101, 113, 125 and 127 can consist of a color which directs a viewer to the following adjacent integral motion image, such as shown in FIGS. 4 and 4A. Such colors could be in the order of colors of the rainbow, for example red, orange, yellow and blue, which would intuitively correctly direct a user from one motion image to the next. Alternatively, a graphic indicator other than an arrow, could actually be placed in a view of the motion image itself, although it will be understood in such case that the graphic will be selected such that it is clearly not perceivable as a scene element to a viewer. Another visual indicator would be to have one or more view at or near the end of one sequence, to become dimmer so as to lead into the brighter first views of the following sequence. Visual indicators such as those in the form of a graphic and/or words directing a user from one lenticular image to the following lenticular image, could be sized to occupy only a part of a view (such as a strip adjacent one or more borders) with the remainder of the view containing another image in the sequence of views of that integral image.

Figure 5:
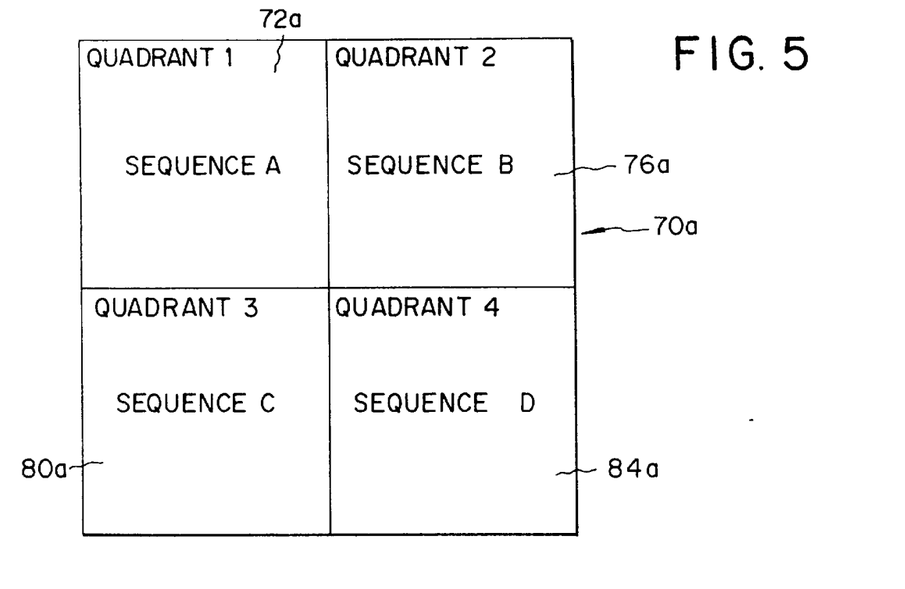
FIGS. 5 and 5A are views similar to FIGS. 2 and 2A but illustrating an optional arrangement in which the integral motion images are arranged so the direction in which each is tilted to show the correct sequence of views of each integral motion image, alternates between adjacent integral motion images.
Figure 5A:
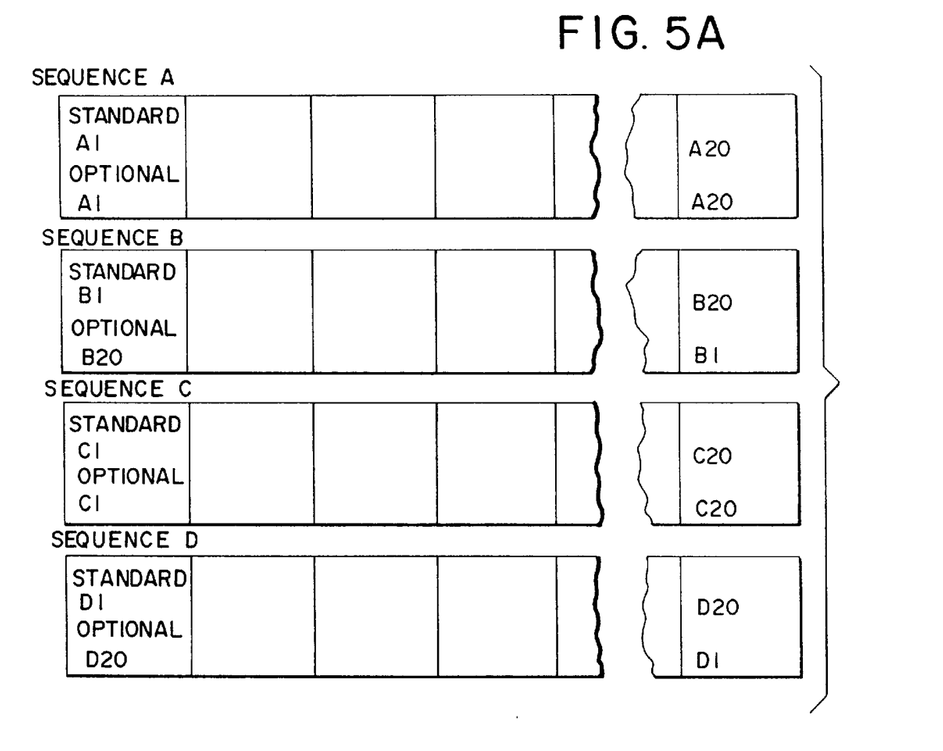

It will be appreciated in the displays of FIGS. 3 and 4 that it is necessary for a user to tilt the display back and forth at least 3 and ½ cycles in order to completely view all of the views in each of the four motion images. This is somewhat tedious and the necessary motion can be reduced by using an arrangement shown in FIG. 5. In particular, in FIGS. 5 and 5A motion image display 70*a* is similar to that of FIG. 4 but each lenticular motion images 72*a,* 76*a,* 80*a,* 84*a* includes 20 views. The views are labeled 1 through 20 with a preceding letter indicating which motion image those views are from. For example, views A1 through A20 are the 20 views of lenticular motion image 72*a.* The sequence in which the views will normally be observed by a user (which is the correct logical motion sequence for the views) is the view arrangement labeled "Standard" in FIG. 5. Such a standard view arrangement corresponds to that such as for Sequences A through D of FIG. 2.

However, tilting display 70*a* back to its starting position before viewing the next sequence, can be completely avoided by reversing the view order for each alternate adjacent motion image. This is indicated by the "Optional" view arrangement in FIG. 5. Thus, in this Optional configuration, while the view orders in Sequences A and C remain the same as in the Standard configuration, the order of views B1 through B20 and C1 through C20 are reversed to B20 through B1, and C20 through C1. As a result of this arrangement the direction in which each motion image 72*a,* 76*a,* 80*a,* 84*a* needs to be tilted to show the correct sequence of the views, alternates between adjacent integral motion images. More particularly, while display 70*a* may need to be tilted backward from an initial to final position to see the views of Sequence A in their correct order, the views of Sequence B can then be seen by tilting display 70*a* forward from the final to initial position. The views of Sequence C can then be seen in correct order by tilting backward again from the initial to final position, followed by seeing the views of Sequence D by tilting forward from the final to initial positions. Thus, only two cycles of movement are required to correctly see the motion in all four lenticular motion images.

It will be appreciated that modifications can be made to the present invention. For example, while the invention has particular application to a display carrying a plurality of integral motion images, the same concept could usefully be applied even where the integral images do not exhibit motion. For example such an integral image display might carry, on a single substrate, a plurality of separate integral images on different regions of the substrate, each of which images has a plurality of views wherein a view in one integral image sequentially follows from a view in another integral image.

Another modification would be to use vertically oriented lenticules for each lenticular image. However, this is not as desirable since both eyes should see the same view, which implies strips or lines from a given view will need to be wider or replicated and that therefore the number of views which can be placed under each lenticule will be reduced. However, such an arrangement may be used in particular where it is desired to have each lenticular image be a three-dimensional image or depth image, such as described in U.S. Pat. No. 5,543,964. Of course, each three-dimensional image need not contain motion. For example, each of four three-dimensional lenticular images arranged in a quadrant similar to the displays of FIGS. 2–5 (but with vertically oriented lenticules) could contain views taken over 90 degrees of a scene or about an object, so that the four three-dimensional lenticular images together provide a 360 degree panoramic view of the scene or about the object. By a "three-dimensional image", is meant an integral image which, when viewed through the front side of the lens sheet (that is viewed through the lens elements), has a visible depth element as a result of the various views being relationally configured to appear as the views that would be seen from different positions when actually viewing a three-dimensional object. A depth element means the ability to at least partially look around an object in the scene.

The invention has been described with reference to a preferred embodiment. However, it will be appreciated that variations and modifications can be effected by a person of ordinary skill in the art without departing from the scope of the invention.

PARTS LIST

| | |
|---|---|
| 1–20 | Views |
| 2 | Display |
| 3 | Viewers Eyes |
| 4, 10 | Images |
| 12 | Lenticules |
| 14 | Lens Sheet |
| 18 | Substrate |
| 19 | Arrow |
| 20–30 | Views |
| 40 | Person |
| 41 | Golf Club |
| 42 | Golf Ball |
| 43 | Flat |
| 45 | Tree |
| 50–60 | Views |
| 50a–60a | Lines |
| 70, 70a | Display |
| 72a, 76a, 80a, 84a | Motion Image |
| 74, 76, 80, 84 | Lenticular Motion Image |
| 90–100, 102–112, 114–124, 126–136 | Views |
| 90a,–l00a, 102a–112a, 114a–124a, 126a–136a | Views |
| 101, 113, 125, 127 | Last Views |

What is claimed is:

1. A motion image display supporting, on a single substrate, at least first and second different integral motion images positioned at first and second different physical locations of the substrate, each integral motion image having a plurality of views in which at least one portion of the views forms a continuous motion sequence extending from said first integral motion image to said second integral motion image; wherein said first and second integral motion images are viewed sequentially by tilting said substrate first and second times, respectively; wherein each of said first and second different integral motion images are interlaced motion images supported by a flat substrate, said first and second different integral motion images not being interlaced together in alignment with the interlaced motion images, the interlaced motion images and lenticular lenses being arranged so that the motion images can be viewed through the lenticular lenses by tilting the substrate and said first and second images being viewable under different segments of said lenticular lenses.

2. A motion image display supporting, on a single substrate, at least first and second different integral motion images positioned at first and second different physical locations of the substrate, each integral motion image having a plurality of views in which at least one portion of the views forms a continuous motion sequence extending from said first integral motion image to said second integral motion image; wherein said first and second integral motion images are viewed sequentially by tilting said substrate first and second times, respectively; wherein each of said first and second different integral motion images are interlaced motion images supported by a flat substrate, said first and second different integral motion images not being interlaced together in alignment with the interlaced motion images, the interlaced motion images and lenticular lenses being arranged so that the motion images can be viewed through the lenticular lenses by tilting the substrate and said first and second images being viewable under different segments of said lenticular lenses wherein said plurality of views of each of said integral images are arranged so that tilting of the substrate in one direction shows the plurality of views of said first integral motion image in their correct sequence until an end of the sequence, and then tilting the substrate in the opposite direction shows the plurality of views of said second integral motion images in their correct sequence.

3. An integral image display according to claim 2 wherein each integral motion image has a correct sequence of views and wherein the integral motion images are arranged so the direction in which each is tilted to show the correct sequence of views of each integral motion image, alternates between adjacent integral motion images.

4. A motion image display according to claim 2 wherein each integral motion image has a last view and wherein at least the last view of the plurality of views of each integral motion image, has a visual indicator directing a viewer to the next integral motion image to be viewed.

5. A motion image display according to claim 4 wherein each integral motion image has last and first views, and wherein said visual indicator is a faded view of the last view of each integral motion image in comparison to the first view of the next adjacent integral motion image.

6. A motion image display according to claim 4 wherein said visual indicator is a graphic indicator.

* * * * *